(12) United States Patent
Bamford et al.

(10) Patent No.: US 9,128,597 B2
(45) Date of Patent: *Sep. 8, 2015

(54) METHOD FOR SWITCHING USER INTERFACE, ELECTRONIC DEVICE AND RECORDING MEDIUM USING THE SAME

(75) Inventors: Drew Bamford, Taoyuan County (TW); Micah Shotel, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 583 days.

This patent is subject to a terminal disclaimer.

(21) Appl. No.: 13/437,873

(22) Filed: Apr. 2, 2012

(65) Prior Publication Data

US 2012/0192095 A1    Jul. 26, 2012

Related U.S. Application Data

(63) Continuation of application No. 12/339,077, filed on Dec. 19, 2008, now Pat. No. 8,171,417.

(30) Foreign Application Priority Data

Apr. 24, 2008  (TW) .............................. 97115070 A

(51) Int. Cl.
*G06F 15/00* (2006.01)
*G06F 13/00* (2006.01)
*G06F 3/0488* (2013.01)
*G06F 3/0483* (2013.01)

(52) U.S. Cl.
CPC ............ *G06F 3/0488* (2013.01); *G06F 3/0483* (2013.01)

(58) Field of Classification Search
CPC ............................. G06F 3/0488; G06F 3/0483
USPC ......... 715/762–765, 778, 840, 779, 716, 863, 715/784, 854, 740
See application file for complete search history.

(56) References Cited

U.S. PATENT DOCUMENTS

| 6,433,801 | B1 * | 8/2002 | Moon et al. ................... 715/840 |
| 7,240,292 | B2 * | 7/2007 | Hally et al. ................... 715/778 |
| 2005/0024341 | A1 * | 2/2005 | Gillespie et al. ............. 345/173 |
| 2007/0234223 | A1 * | 10/2007 | Leavitt et al. ................. 715/762 |

* cited by examiner

*Primary Examiner* — Kevin Nguyen
(74) *Attorney, Agent, or Firm* — Jianq Chyun IP Office

(57) ABSTRACT

A user interface switching method, and an electronic device and a recording medium using the same are provided. First, a plurality of user interfaces are provided, and one of the user interfaces is displayed in a touch screen of the portable electronic device. A representative icon bar and a hot key bar are displayed in the touch screen, wherein the representative icon bar comprises representative icons respectively corresponding to the user interfaces and the hot key bar comprises one or more hot keys corresponding to the user interface currently displayed in the touch screen. When the touch screen detects a touch signal which falls within the representative icon bar and is moved therein, the representative icon bar is moved correspondingly, and the displayed user interface and hot keys are also switched according to the representative icon on which the touch signal is terminated.

20 Claims, 8 Drawing Sheets

(a)

(b)

METHOD FOR SWITCHING USER INTERFACE, ELECTRONIC DEVICE AND RECORDING MEDIUM USING THE SAME

CROSS-REFERENCE TO RELATED APPLICATION

This application is a continuation application of and claims the priority benefit of a prior application Ser. No. 12/339,077, filed on Dec. 19, 2008. The prior application Ser. No. 12/339,077 claims the priority benefit of Taiwan application serial no. 97115070, filed on Apr. 24, 2008. The entirety of each of the above-mentioned patent applications is hereby incorporated by reference herein and made a part of this specification.

BACKGROUND OF THE APPLICATION

1. Field of the Application

The present application generally relates to a method and an apparatus for switching a user interface, and in particular, to a method and an apparatus for switching a user interface by using a representative icon bar.

2. Description of Related Art

In order to catch up with the quick pace for the modern life of the mass, various portable electronic devices that can be conveniently taken along without occupying a large space have been increasingly developed. For example, a personal digital assistant (PDA) or a PDA phone not only provides various functions of a conventional communication device, but also enables a user to write a document, send/receive E-mails, browse networks, or use instant messaging software through a built-in windows operation system. That is to say, the portable electronic device may not only be used to make a call, but further provide various diversified functions like a small personal computer. As for the modern people who stress on efficiency, such communication device has become one of the indispensable tools.

However, considering the outlay requirements for the portable electronic device of being light, thin, short, and small, the volume of the device is quite limited. If it intends to dispose both a screen and a keypad on the device, the size of the screen has to be reduced. In order to configure a larger screen within a limited space, recently, a touch screen has been developed. The touch screen with a keypad integrated therein serves as an input interface for the portable electronic device, so as to save the cost for configuring the conventional keypad and reduce the occupied area.

However, the size of the touch screen on the portable electronic device is still limited. On the contrary, the functions of the portable electronic device are quite diversified. In order to display various function items on a limited screen for the user to select, the mobile phones available from the current market mostly adopt a patterned operation interface, in which various functions are indicated by reduced icons, and the reduced icon are arranged in the touch screen.

FIG. 1 is a schematic view of a conventional graphic operation interface. Referring to FIG. 1, in a graphic operation interface 100, the touch screen is divided into a plurality of display blocks, which are respectively used for displaying various graphic items such as Home 110, Contacts 120, Messages 130, E-mail 140, Camera 150, Music player 160, Browser 170, Weather 180, Settings 190, and the like. Although such a mode enables the user to clearly see all the functions or the frequently used functions of the portable electronic device, once the user selects a certain graphic item to enter a corresponding operation interface, he/she cannot switch to other functions, and has no option but returns to the original graphic operation interface 100 for selecting once again, which is inconvenient.

SUMMARY OF THE APPLICATION

Accordingly, the present application is directed to a user interface switching method, wherein a representative icon bar representing various functions of a portable electronic device is adopted to switch between user interfaces such that a more convenient method for switching between the user interfaces is provided.

The present application is directed to a portable electronic device adapted to switch a user interface thereof, in which a user interface, a representative icon bar, and a hot key bar are respectively displayed in a screen by a plurality of modules, and these components are switched according to a touch action of a user so as to provide a desired user interface and related hot keys for the user.

The present application provides a user interface switching method which is suitable for a portable electronic device having a touch screen. The method comprises following steps. First, a plurality of user interfaces is provided, and one of the user interfaces is displayed in the touch screen. Besides, a representative icon bar and a hot key bar are displayed in the touch screen, wherein the representative icon bar comprises a plurality of representative icons respectively corresponding to the user interfaces, and the hot key bar comprises one or multiple hot keys corresponding to the currently displayed user interface. Next, a touch signal is detected by the touch screen, wherein when the touch signal falls within the representative icon bar and is moved therein, the portable electronic device moves the representative icon bar correspondingly and switches the user interface and the hot keys according to the representative icon on which the touch signal is terminated.

According to an embodiment of the present application, the user interface switching method further comprises switching the user interface and switching the hot keys and moving the representative icon bar according to the switched user interface when the touch signal falls within the user interface and is moved therein.

According to an embodiment of the present application, the step of detecting the touch signal by the touch screen further comprises determining whether a displacement of the touch signal exceeds a predetermined value, and switching the user interface when the displacement exceeds the predetermined value, wherein the displacement comprises a horizontal displacement or a vertical displacement.

According to an embodiment of the present application, when the user interface displayed in the touch screen is the user interface corresponding to the representative icon at an end of the representative icon bar and the touch signal is moved within the user interface, the displayed user interface can be directly switched to the user interface corresponding to the representative icon at the other end of the representative icon bar.

According to an embodiment of the present application, the step of directly switching the displayed user interface to the user interface corresponding to the representative icon at the other end of the representative icon bar further comprises moving the representative icon bar to the representative icon at the other end of the representative icon bar.

According to an embodiment of the present application, the step of correspondingly moving the representative icon bar further comprises enlarging the representative icon to which the touch signal is moved in the representative icon bar.

According to an embodiment of the present application, the user interface switching method further comprises enlarging the representative icon corresponding to the displayed user interface in the representative icon bar.

According to an embodiment of the present application, the user interface switching method further comprises determining the representative icon to which the touch signal is moved and displaying a user interface preview icon corresponding to this representative icon, wherein the user interface preview icon is an enlarged image of the representative icon, or the user interface preview icon comprises the enlarged image of the representative icon and a text description thereof.

According to an embodiment of the present application, the step of correspondingly moving the representative icon bar comprises moving the representative icon bar in a direction the same as or opposite to the moving direction of the touch signal.

According to an embodiment of the present application, the representative icon bar is connected end to end, namely, when the representative icon bar displayed in the touch screen is moved to the representative icon at an end thereof the representative icon bar, the representative icon at the other end of the representative icon bar is then displayed.

According to an embodiment of the present application, the representative icon bar may be displayed below the user interface, and the hot key bar may be displayed at the bottom of the touch screen.

According to an embodiment of the present application, the portable electronic device may be a cell phone, a smart phone, a personal digital assistant (PDA), or a PDA phone.

The present application provides a portable electronic device adapted to switch a user interface thereof. The portable electronic device comprises a touch screen, a user interface display module, a representative icon bar display module, a hot key bar display module, and a switch module. The touch screen is used for detecting a touch signal. The user interface display module is used for displaying one of a plurality of user interfaces in the touch screen. The representative icon bar display module is used for displaying a representative icon bar in the touch screen, wherein the representative icon bar comprises a plurality of representative icons respectively corresponding to the user interfaces. The hot key bar display module is used for displaying a hot key bar in the touch screen, wherein the hot key bar comprises one or multiple hot keys corresponding to the currently displayed user interface. The switch module is used for switching the user interface and the hot keys and moving the representative icon bar according to the touch signal detected by the touch screen. When the touch signal falls within the representative icon bar and is moved therein, the switch module moves the representative icon bar displayed by the representative icon bar display module correspondingly and switches the user interface displayed by the user interface display module and the hot keys displayed by the hot key bar display module according to the representative icon on which the touch signal is terminated.

According to an embodiment of the present application, the switch module further switches the displayed user interface, and switches the hot keys and moves the representative icon bar according to the switched user interface when the touch signal falls within the user interface and is moved therein.

According to an embodiment of the present application, the switch module further determines whether a displacement of the touch signal exceeds a predetermined value, and switches the user interface when the displacement exceeds the predetermined value, wherein the displacement comprises a horizontal displacement or a vertical displacement.

According to an embodiment of the present application, when the user interface displayed in the touch screen is the user interface corresponding to the representative icon at an end of the representative icon bar, the switch module directly switches the displayed user interface to the user interface corresponding to the representative icon at the other end of the representative icon bar.

According to an embodiment of the present application, the switch module further moves the representative icon bar to the representative icon at the other end of the representative icon bar when the switch module directly switches the displayed user interface to the user interface corresponding to the representative icon at the other end of the representative icon bar.

According to an embodiment of the present application, the representative icon bar display module further enlarges the representative icon to which the touch signal is moved in the representative icon bar.

According to an embodiment of the present application, the representative icon bar display module further enlarges the representative icon corresponding to the displayed user interface in the representative icon bar.

According to an embodiment of the present application, the switch module further determines the representative icon to which the touch signal is moved and displays a user interface preview icon corresponding to this representative icon.

According to an embodiment of the present application, the user interface preview icon is an enlarged image of the representative icon.

According to an embodiment of the present application, the user interface preview icon is an enlarged image of the representative icon and a text description thereof.

According to an embodiment of the present application, the representative icon bar display module moves the representative icon bar in a direction the same as or opposite to the moving direction of the touch signal.

The present application provides a recording medium for recording a computer program, wherein the computer program comprises a plurality of program codes, and the computer program is suitable for being loaded into a portable electronic device to enable the portable electronic device to execute a user interface switching method. The user interface switching method comprises following steps. First, a plurality of user interfaces is provided, and one of the user interfaces is displayed in a touch screen. Besides, a representative icon bar and a hot key bar are also displayed in the touch screen, wherein the representative icon bar comprises a plurality of representative icons respectively corresponding to the user interfaces, and the hot key bar comprises one or multiple hot keys corresponding to the currently displayed user interface. Next, a touch signal is detected by the touch screen, wherein when the touch signal falls within the representative icon bar and is moved therein, the portable electronic device moves the representative icon bar correspondingly and switches the user interface and the hot keys according to the representative icon on which the touch signal is terminated.

In the present application, a representative icon bar is displayed in a screen, and a currently displayed user interface and hot keys are switched according to a touch action detected within the representative icon bar, or the currently displayed representative icon bar and hot keys are switched according to the touch action detected within the user interface. Thereby, a more convenient method for switching a user interface is provided.

BRIEF DESCRIPTION OF THE DRAWINGS

The accompanying drawings are included to provide a further understanding of the application, and are incorporated

DESCRIPTION OF THE EMBODIMENTS

Figure 1:
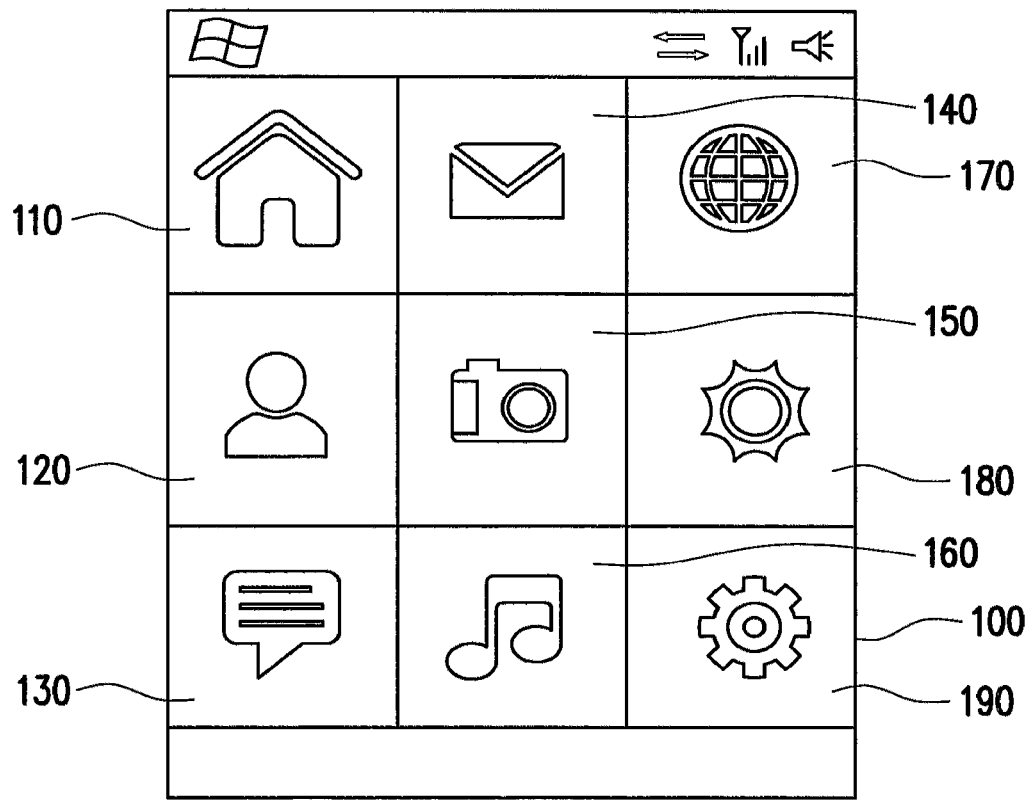
FIG. 1 is a diagram of a conventional graphical user interface.

Reference will now be made in detail to the present embodiments of the application, examples of which are illustrated in the accompanying drawings. Wherever possible, the same reference numbers are used in the drawings and the description to refer to the same or like parts.

A portable electronic device offers many functions, and a user interface corresponding to each of the functions has to be provided so as to allow a user to operate this function. In order to allow the user to switch between these user interfaces smoothly, in the present application, a representative icon is designed regarding each function or each frequently used function of the portable electronic device, and all the representative icons are integrated as a representative icon bar and displayed in a screen. The user may trigger or move the representative icon bar by touching, dragging, or sliding it so as to select a desired representative icon, and the portable electronic device displays the corresponding user interface and hot keys in the screen so as to provide a more convenient method for switching between the user interfaces. Accordingly, the present application provides a user interface switching method and an portable electronic device and a recording medium using the same based on aforesaid concept. Embodiments of the present application will be described below with reference to accompanying drawings.

Figure 2:
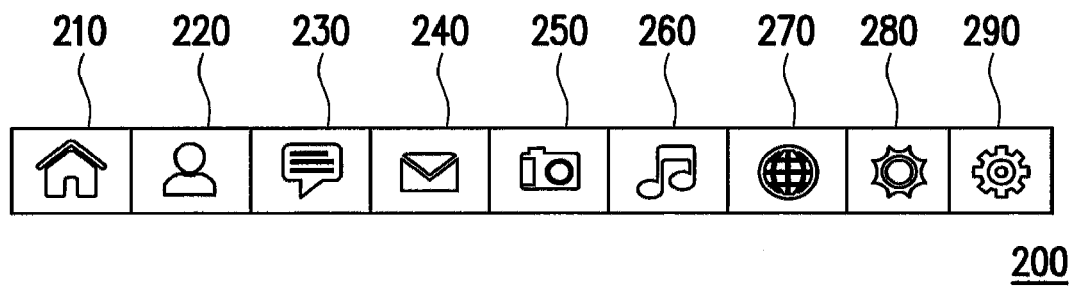
FIG. 2 is a diagram of a representative icon bar according to an embodiment of the present application.
Figure 3:
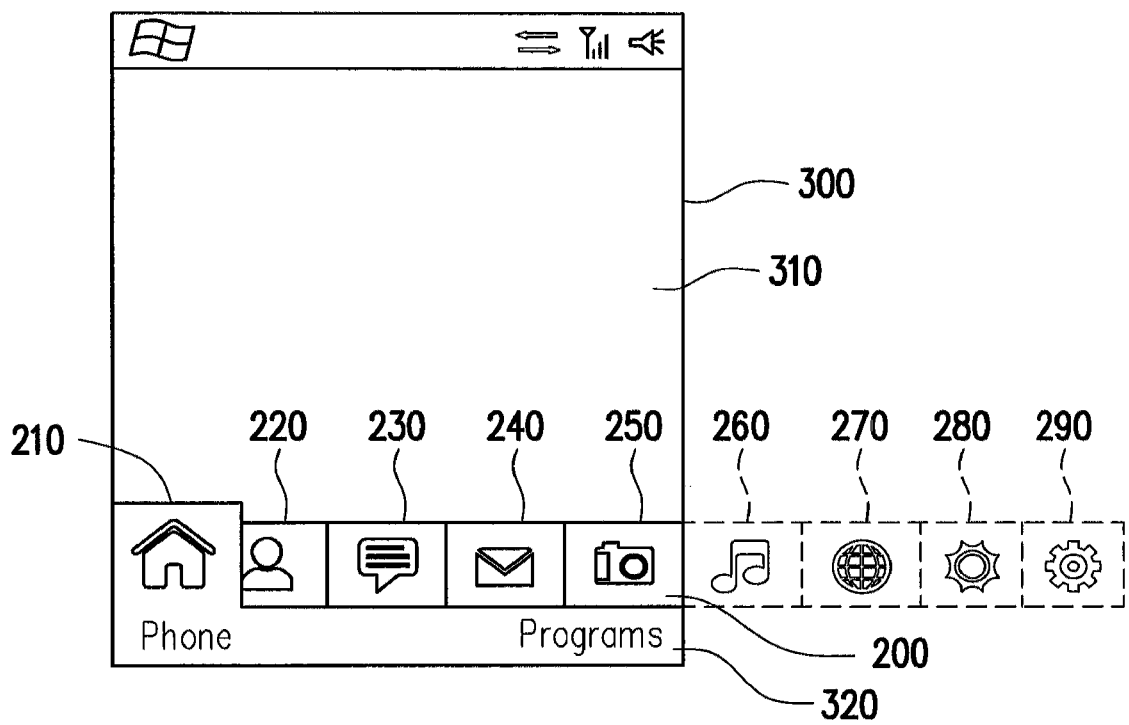
FIG. 3 is a diagram of displaying a representative icon bar in a touch screen according to an embodiment of the present application.

FIG. 2 is a schematic diagram of a representative icon bar according to an embodiment of the present application. FIG. 3 is a schematic diagram for displaying a representative icon bar in a touch screen according to an embodiment of the present application. Referring to FIG. 2 first, in the present embodiment, all the functions of the portable electronic device are represented by a representative icon bar 200, and the representative icon bar 200 comprises a plurality of representative icons, such as Home 210, contact 220, message 230, e-mail 240, camera 250, music 260, Internet 270, weather 280, and settings 290. Foregoing content of the representative icon bar 200 is only an example but not used for limiting the scope of the present application, and those skilled in the art should be able to dispose different types and number of representative icons in the representative icon bar 200 according to the actual requirement.

Referring to FIG. 3, the portable electronic device displays the representative icon bar 200 at the bottom of the touch screen 300. Since the space of the touch screen 300 is limited, only the first 5 representative icons in the representative icon bar 200 are displayed. When a user clicks one of the representative icons, the portable electronic device displays a corresponding user interface 310 in a block above the representative icon bar 200. On the other hand, the portable electronic device also displays a corresponding hot key bar 320 in a block below the representative icon bar 200. In short, the user interface 310 and the hot key bar 320 are corresponding to the same function of the portable electronic device, and the contents thereof are determined by the function. Accordingly, the user interface 310 and the hot key bar 320 are switched together once the user switches to another function.

A user interface switching method is provided based on foregoing structure of representative icon bar, and accordingly the user can move the representative icon bar or switch the user interface quickly so as to browse or select the desired function. An embodiment of the present application regarding to this method will be described below.

Figure 4:
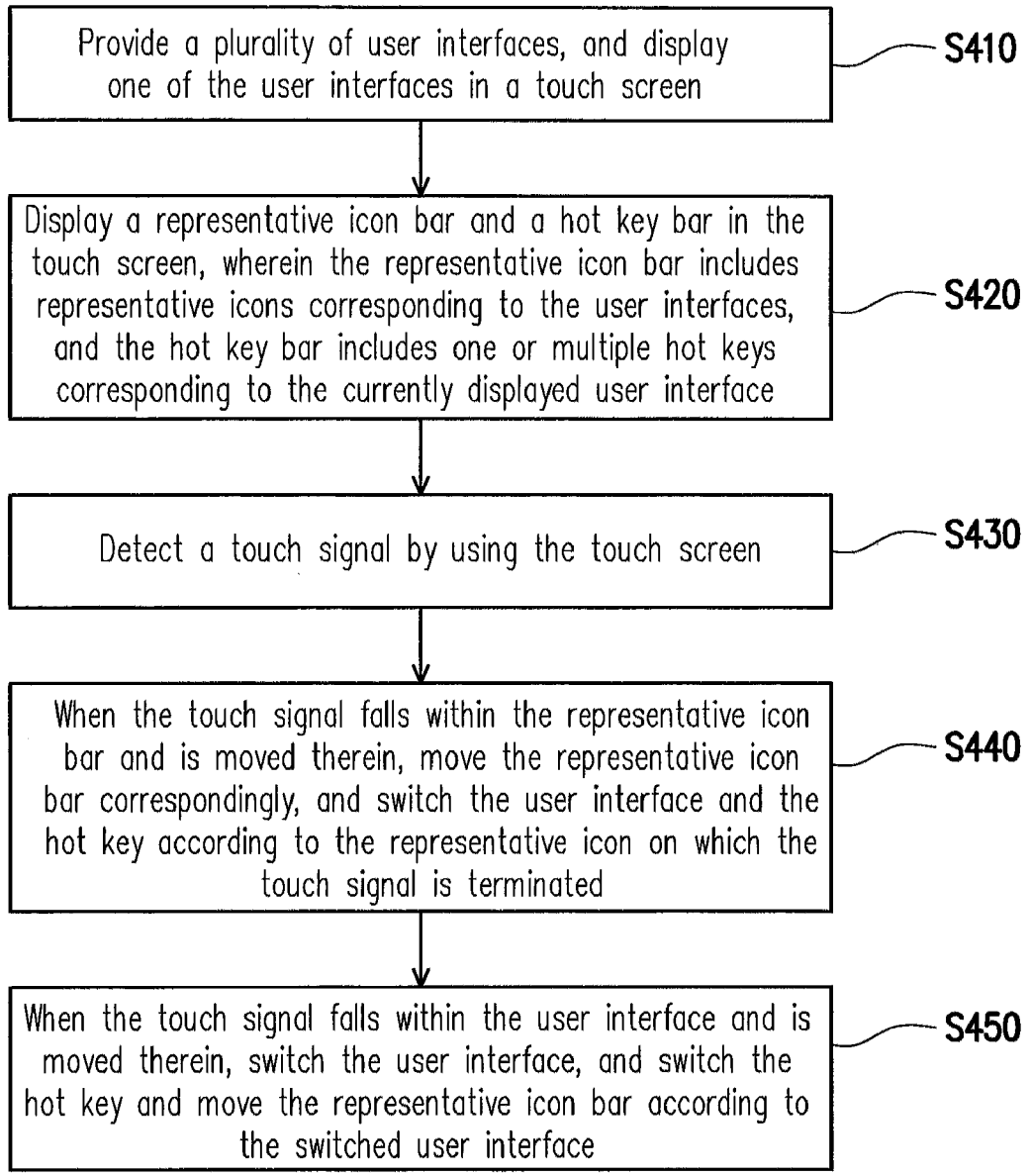
FIG. 4 is a flowchart of a user interface switching method according to an embodiment of the present application.

FIG. 4 is a flowchart of a user interface switching method according to an embodiment of the present application. Referring to FIG. 4, the present embodiment is suitable for a portable electronic device having a touch screen, and the portable electronic device may be a cell phone, a smart phone, a personal digital assistant (PDA), or a PDA phone, but is not limited thereto.

First, a plurality of user interfaces is provided, and one of the user interfaces is displayed in the touch screen (step S410). When the portable electronic device is turned on or is stand-by, the user interface of Home (containing information such as today's date, current time, or signal strength, etc) is displayed in the touch screen so that the user can understand the current state of the portable electronic device. However, the user interface of the last function operated by the user may also be displayed by the portable electronic device, but is not limited thereto.

While displaying the user interface, the portable electronic device also displays a representative icon bar and a hot key bar in the touch screen (step S420). The representative icon bar comprises representative icons respectively corresponding to the user interfaces (or functions), and the representative icon bar may be displayed below the user interface. The hot key bar comprises one or multiple hot keys corresponding to the currently displayed user interface, and the hot key bar may be displayed at the bottom of the touch screen.

To be specific, the number of representative icons in the representative icon bar may be determined according to the number of functions built in the portable electronic device and the number of the frequently used functions, or may also be set by the user, and patterns related to the functions are used as the representative icons so that the user can browse the functions of the portable electronic device quickly. For example, a house picture can be used for representing the home, a human figure can be used for representing the contact function, and a letter image can be used for representing the e-mail function, etc.

Then, the portable electronic device detects a touch signal of the user through the touch screen (step S430). When the touch signal detected by the touch screen falls within the representative icon bar and is moved therein, the portable electronic device moves the representative icon bar correspondingly and switches the user interface and the hot key according to the representative icon on which the touch signal is terminated (step S440).

To be specific, if the user simply clicks a representative icon, the touch screen detects the touch signal at a single point, and the user may be notified of the currently clicked representative icon by enlarging the representative icon on which the touch signal is located. Besides, the user interface and the hot key are switched according to the representative icon on which the touch signal is located.

However, if the user touches the representative icon bar by dragging or sliding his finger or a stylus, the touch screen detects a continuous touch signal, namely, the touch signal has a displacement. The portable electronic device then further determines how to move the representative icon bar according to the displacement, and when the touch signal is terminated, the portable electronic device selects the user interface to be switched according to the representative icon on which the touch signal is terminated.

Aforementioned displacement may be a horizontal displacement or a vertical displacement depending on the orientation of the representative icon bar. For example, if the representative icon bar is displayed horizontally in the touch screen, the user may move the representative icon bar by dragging it horizontally by intuition, and then the portable electronic device determines whether to switch the user interface and the hot key according to the value of the horizontal displacement. Besides, the moving direction of the representative icon bar may be opposite to or the same as the moving direction of the touch signal, namely, the user touches the screen and slides his finger or a stylus in a direction the same as or opposite to the moving direction of the representative icon bar.

Figure 5:
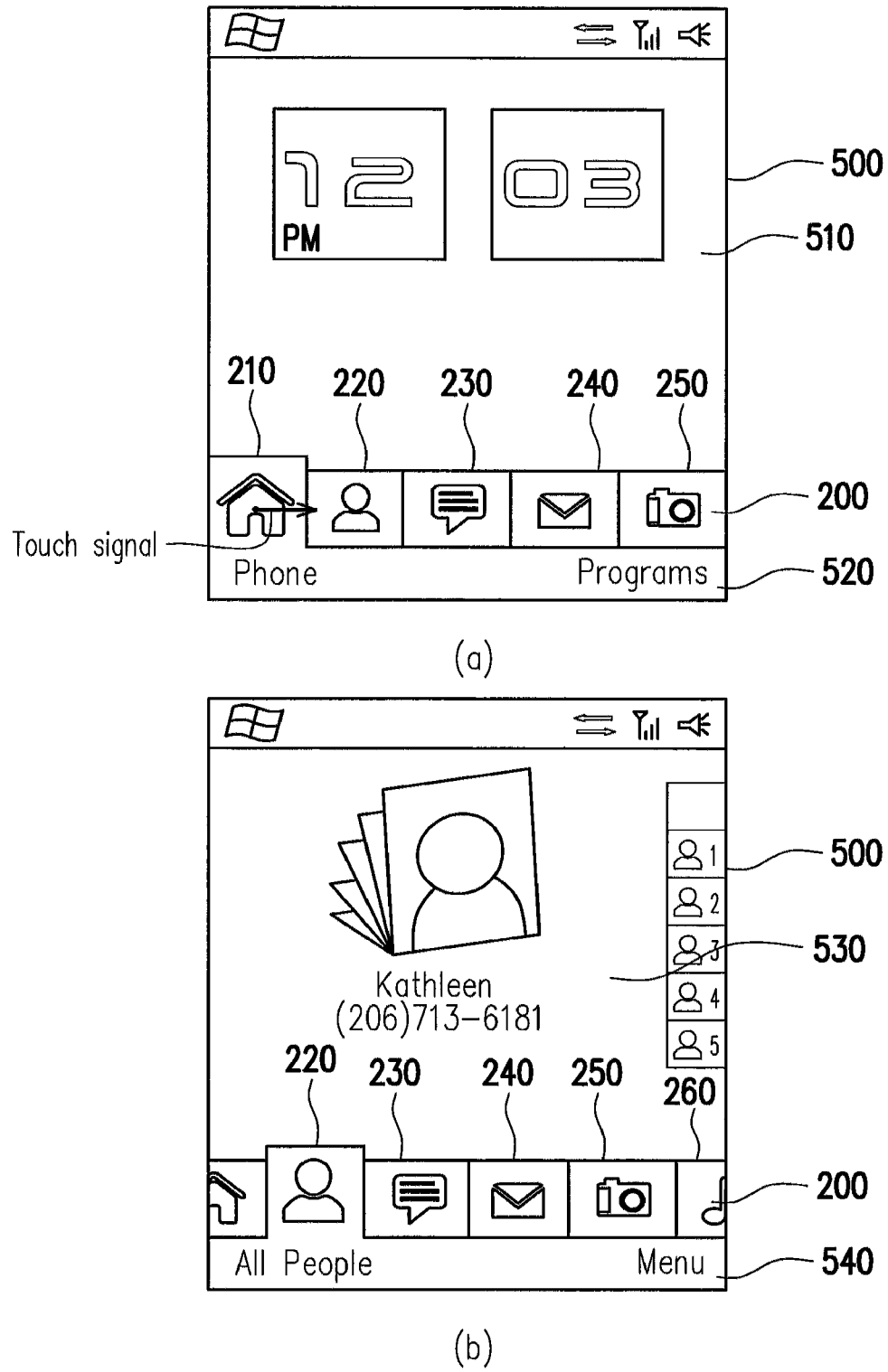
FIG. 5(a) and FIG. 5(b) are diagrams of a user interface switching method according to an embodiment of the present application.

FIG. 5(a) and FIG. 5(b) are schematic diagrams of a user interface switching method according to an embodiment of the present application. Referring to FIG. 5(a) first, in the present embodiment, the first 5 representative icons in the representative icon bar 200 (for example, including 9 representative icons in total) are displayed in the touch screen 500. If the user clicks the representative icon of the Home 210 and then slides rightwards, the portable electronic device moves the representative icon bar 200 leftwards to switch to the representative icon of the contact 220. Meanwhile, the portable electronic device also switches the user interface 510 and the hot key bar 520 originally displayed in the touch screen 500 to the user interface 530 and the hot key bar 540 corresponding to the contact 220. The user can then search for contact's data or call a contact through the user interface 530 or may also list all the contacts by using the hot key 540.

It should be mentioned herein that when the user keeps sliding and moving to a particular representative icon in the representative icon bar, in order to allow the user to understand the function corresponding to the representative icon, the portable electronic device can display a user interface preview icon corresponding to the particular representative icon. The user interface preview icon may be an enlarged image of the representative icon or an enlarged image together with a text description of the representative icon. However, the scope of the user interface preview icon is not limited in the present application.

Figure 6:
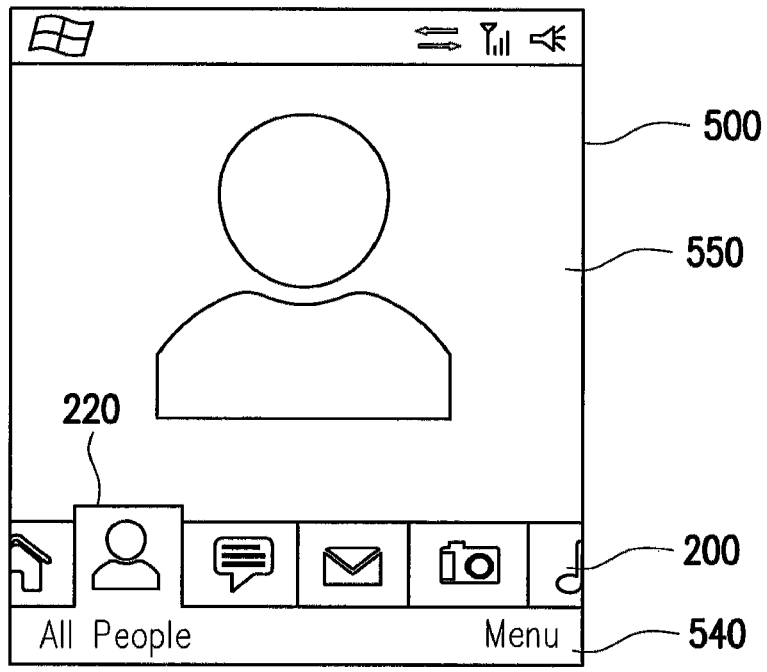
FIG. 6(a) and FIG. 6(b) are diagrams of a user interface switching method according to an embodiment of the present application.
Figure 6:
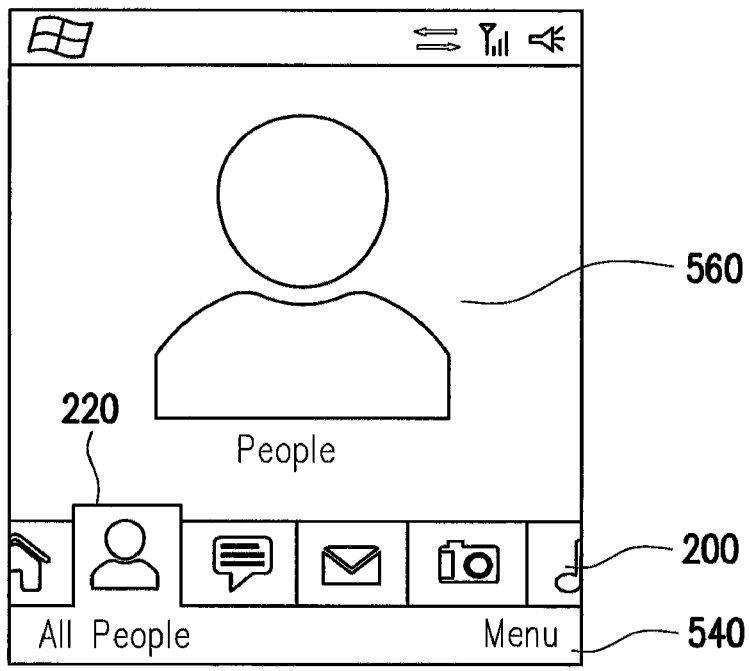

FIG. 6(a) and FIG. 6(b) are diagrams of a user interface switching method according to an embodiment of the present application. Referring to FIG. 5(a) first, in the present embodiment, similarly, when the user clicks the representative icon of the Home 210 and slides rightwards, the portable electronic device moves the representative icon bar 200 leftwards. When the user moves to the representative icon of the contact 220 but does not release his finger or stylus, the portable electronic device first switches the user interface 510 displayed in the touch screen 500 to the user interface preview icon 550 (as shown in FIG. 6(a)) or the user interface preview icon 560 (as shown in FIG. 6(b)) corresponding to the contact 220 so as to allow the user to understand the function corresponding to the representative icon. The user interface preview icon 550 is an enlarged image of the contact 220, and the user interface preview icon 560 is the enlarged image of the contact 220 together with a text description thereof.

As described above, besides the method for switching the user interface and the hot key by touching, clicking, dragging, or sliding the representative icon bar, the present embodiment further provides a more intuitional method for switching the user interface, and similarly, this method switches the user interface also based on the touch signal detected by the touch screen. To be specific, when the touch signal detected by the touch screen falls within the user interface and is moved therein, the portable electronic device switches the user interface, and switches the hot key and moves the representative icon bar according to the switched user interface (step S450), wherein the portable electronic device determines whether a displacement of the touch signal exceeds a predetermined value, and the portable electronic device switches the user interface if the displacement exceeds the predetermined value. The displacement comprises a horizontal displacement or a vertical displacement. However, the scope thereof is not limited in the present application.

Figure 7:
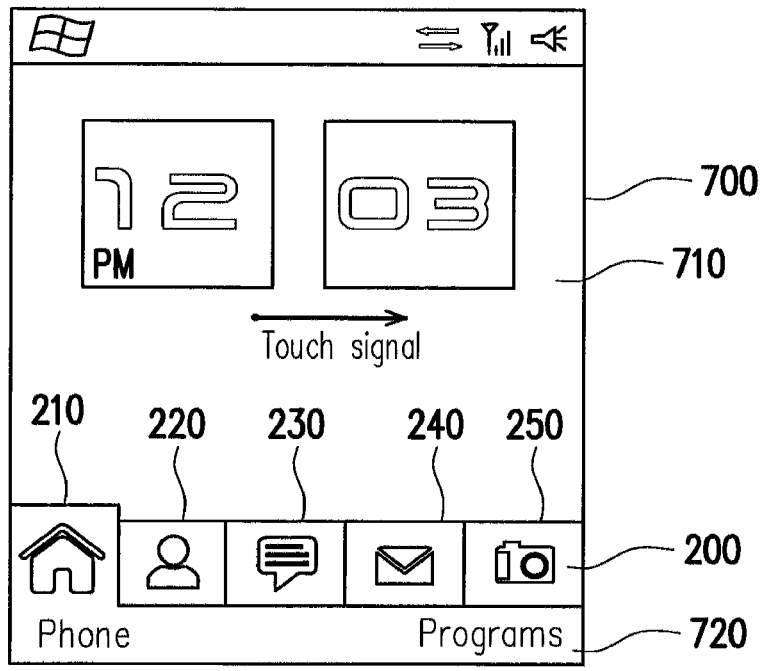
FIG. 7(a) and FIG. 7(b) are diagrams of a user interface switching method according to an embodiment of the present application.
Figure 7:
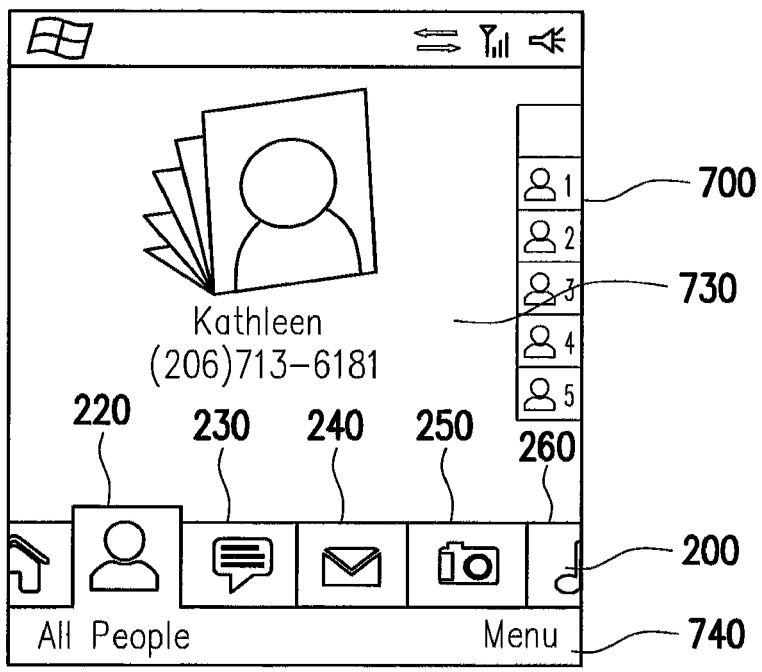

FIG. 7(a) and FIG. 7(b) are schematic diagrams of a user interface switching method according to an embodiment of the present application. Referring to FIG. 7(a) first, in the present embodiment, the first 5 representative icons in the representative icon bar 200 (for example, including 9 representative icons in total) are displayed in the touch screen 700. If the user touches the user interface 710 and slides rightwards for more than a predetermined value, the portable electronic device switches the user interface 710 to the user interface 730 of a next function, moves the representative icon bar 200 correspondingly to switch to the representative icon of the contact 220, and switches the originally displayed hot key bar 720 to the hot key bar 740 corresponding to the contact 220. Accordingly, the user can operate through the user interface 730 and the hot keys in the hot key bar 740.

Through the method described in foregoing embodiment, a user can touch or drag in a user interface or a representative icon bar according to his/her own requirement so as to switch freely between various functions of a portable electronic device. As a result, all the unnecessary or complicated operations can be avoided.

It should be mentioned that in the embodiment described above, if the user interface originally displayed in the touch screen is the user interface corresponding to the representative icon at an end (for example, the leftmost end) of the representative icon bar, when the user touches the user interface and drags leftwards, the portable electronic device directly switches the user interface displayed in the touch screen to the user interface corresponding to the representative icon at the other end (for example, the rightmost end) of the representative icon bar. At the same time, the portable electronic device also moves the representative icon bar to the representative icon at the other end of the representative icon bar.

Figure 8:
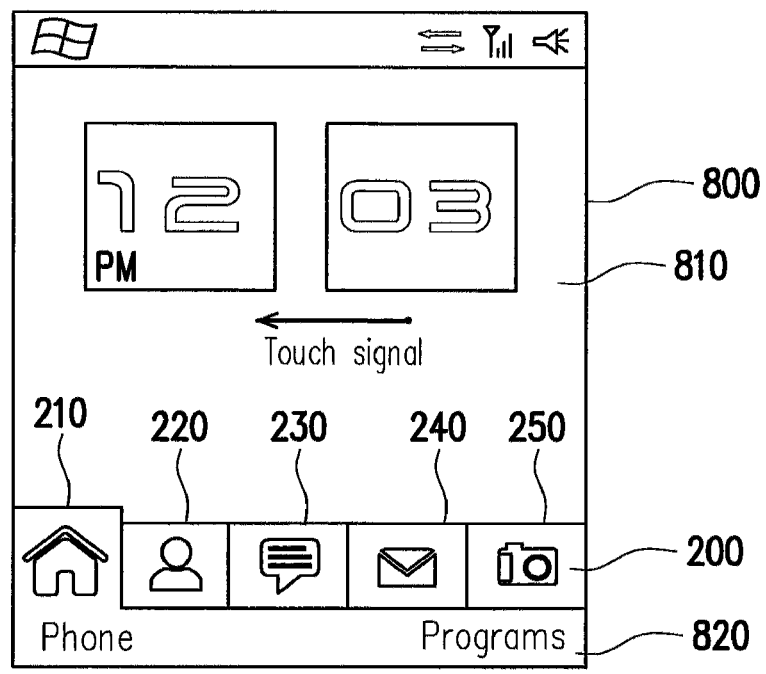
FIG. 8(a) and FIG. 8(b) are diagrams of a user interface switching method according to an embodiment of the present application.
Figure 8:
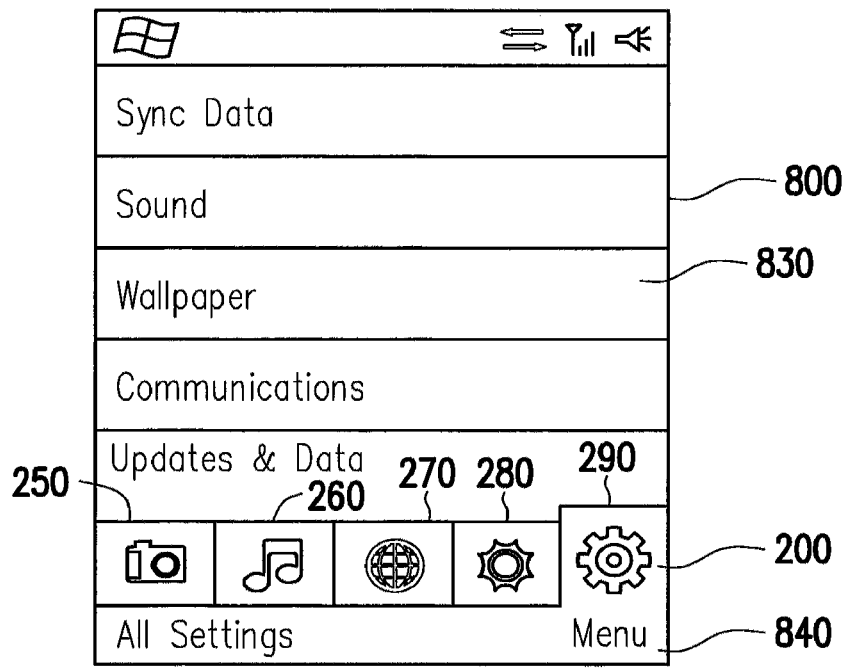

FIG. 8(a) and FIG. 8(b) are schematic diagrams of a user interface switching method according to an embodiment of the present application. Referring to FIG. 8(a) first, in the present embodiment, the first 5 representative icons in the representative icon bar 200 (for example, including 9 representative icons in total) are displayed in the touch screen 800. If the user touches the user interface 810 and slides leftwards for more than a predetermined value, the portable electronic device switches the user interface 810 to the user interface 830 corresponding to the representative icon at the other end of the representative icon bar 200, moves the representative icon bar 200 correspondingly to switch to the representative icon of the settings 290, and switches the originally displayed hot key bar 820 to the hot key bar 840 corresponding to the settings 290. The user can then operate through the user interface 830 and the hot key bar 840.

Figure 9:
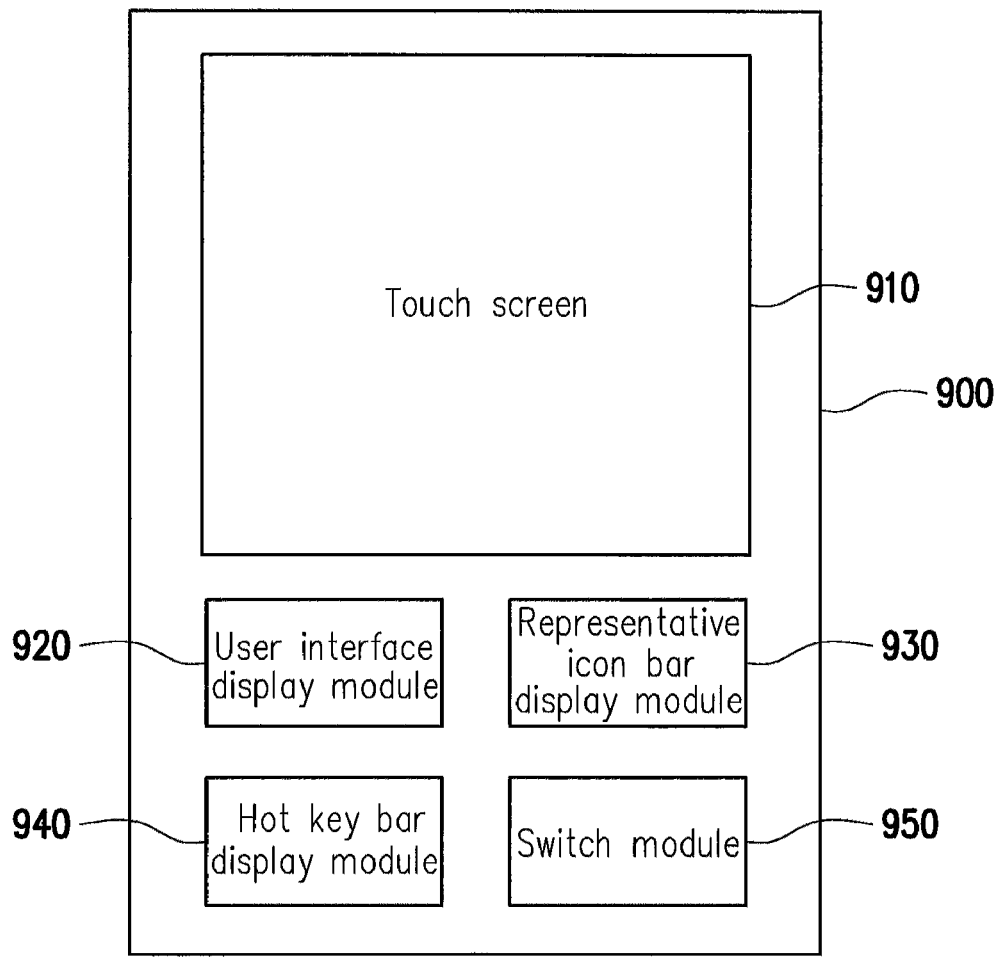
FIG. 9 is a block diagram of a portable electronic device which can switch a user interface according to an embodiment of the present application.

In another embodiment of the present application, the method described above is further applied to a portable electronic device, which will be further described below. FIG. 9 is a block diagram of a portable electronic device adapted to switch a user interface thereof according to an embodiment of the present application. Referring to FIG. 9, in the present embodiment, the portable electronic device 900 may be a cell phone, a smart phone, a PDA, or a PDA phone. However, the scope of the portable electronic device 900 is not limited in the present application. The portable electronic device 900 comprises a touch screen 910, a user interface display module 920, a representative icon bar display module 930, a hot key bar display module 940, and a switch module 950. The functions of foregoing components will be respectively described below.

The touch screen 910 is used for detecting the touch action of a user and accordingly generating a corresponding touch signal. The user interface display module 920 is used for displaying one of a plurality of user interfaces in the touch screen 910. The representative icon bar display module 930 is used for displaying a representative icon bar in the touch screen 910, wherein the representative icon bar comprises a plurality of representative icons respectively corresponding to the user interfaces. Similarly, the hot key bar display module 940 is used for displaying a hot key bar in the touch screen 910, wherein the hot key bar comprises one or multiple hot keys corresponding to the currently displayed user interface.

Through the operation of foregoing three modules, the portable electronic device 900 displays a user interface, the representative icon bar, and the hot key bar at the same time in the touch screen 910 thereof. The switch module 950 switches the user interface and hot keys displayed in the touch screen 910 and moves the representative icon bar correspondingly according to the touch signal detected by the touch screen 910.

When the touch signal falls within the representative icon bar and is moved therein, the switch module 950 moves the representative icon bar displayed by the representative icon bar display module 930 correspondingly and switches the user interface displayed by the user interface display module 920 and the hot keys displayed by the hot key bar display module 940 according to the representative icon on which the touch signal is terminated.

On the other hand, when the touch signal falls within the user interface displayed by the user interface display module 920 and is moved therein, the switch module 950 switches the user interface displayed by the user interface display module 920 and the hot key displayed by the hot key bar display module 940 and at the same time, moves the representative icon bar displayed by the representative icon bar display module 930 correspondingly. When the switch module 950 determines whether the touch signal is moved within the user interface, it further determines whether a displacement of the touch signal exceeds a predetermined value. The switch module 950 switches the user interface and the hot keys and moves the representative icon bar only when the displacement exceeds the predetermined value. The displacement comprises a horizontal displacement or a vertical displacement.

It should be mentioned herein that when the touch screen 910 detects the touch signal, the representative icon bar display module 930 further enlarges the representative icon in the representative icon bar according to the position of the touch signal so as to remind the user of the currently clicked or touched representative icon. In addition, the representative icon bar display module 930 determines whether to move the representative icon bar along or opposite to the moving direction of the touch signal.

On the other hand, the present application further provides a recording medium such as an optic disk, a magnetic disk, and a removable hard disk for recording a computer-readable authorization sign-off program so as to perform the user interface switching method as described above. Here, the authorization sign-off program recorded in the recording medium is basically composed of a plurality of program code segments such as program code segments for establishing an organization chart, sign-off form program code segments, setting program code segments, and deployment program code segments. The functions of those program code segments correspond to the steps of the above user interface switching method and the functional block diagram of the above portable electronic device.

In overview, the present application provides a user interface switching method and an electronic device and a recording medium using the same, wherein a representative icon bar is displayed in the touch screen and a touch signal generated by a user is detected through the touch screen. When the user drags the representative icon bar, the user interface and hot key displayed in the touch screen are switched correspondingly. On the other hand, when the user drags and switches the user interface, the representative icon bar is moved correspondingly and the hot key is switched. Thereby, a more convenient method for switching a user interface is provided so as to allow a user to switch freely between various functions.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A user interface switching method, for use in a portable handheld electronic device having a touch screen, the method comprising:
    providing a plurality of user interfaces, and displaying one of the user interfaces in the touch screen of the portable handheld electronic device;
    displaying a representative icon bar and a hot key bar in the touch screen, wherein the representative icon bar comprises a plurality of representative icons respectively corresponding to the user interfaces, and the hot key bar comprises at least one hot key corresponding to the currently displayed user interface;
    detecting a touch signal in response to a touch from a user by the touch screen; and
    in response to the touch signal being detected to fall in the representative icon bar, move within the representative icon bar and terminated on a representative icon, switching the user interface and correspondingly switching the hot key according to the representative icon on which the touch signal is terminated.

2. The method according to claim 1, further comprising:
highlighting the representative icon to which the touch signal is moved in the representative icon bar.

3. The method according to claim 1, further comprising:
highlighting the representative icon corresponding to the displayed user interface in the representative icon bar.

4. The method according to claim 1, further comprising:
determining the representative icon to which the touch signal is moved; and
displaying a user interface preview text description corresponding to the representative icon to which the touch signal is moved.

5. The method according to claim 1, wherein each of the user interfaces is corresponding to a function or a sub-function of a function.

6. A user interface switching method, for use in a portable handheld electronic device having a touch screen, the method comprising:
providing a plurality of user interfaces, and displaying one of the user interfaces in the touch screen of the portable handheld electronic device;
displaying a representative icon bar in the touch screen, wherein the representative icon bar comprises a plurality of representative icons respectively corresponding to the user interfaces, and displaying a bar comprising at least one hot key corresponding to the currently displayed user interface;
detecting a first touch signal in response to a touch from a user by the touch screen; and moving the representative icon bar according to the displacement of the detected first touch signal in response to the first touch signal being detected to fall in the representative icon bar; and
detecting a second touch signal in response to a touch signal from a user by the touch screen; and switching the user interface and correspondingly switching the hot key according to the representative icon on which the second touch signal is detected in response to the second touch signal being detected to fall in the representative icon and terminated in the representative icon in the representative icon bar.

7. The method according to claim 6, wherein each of the user interfaces is corresponding to a function or a sub-function of a function.

8. A user interface switching method, for use in a smart phone having a touch screen and comprising contacts, messages, e-mail, camera, music player, browser, weather, and setting functions, the method comprising:
providing a plurality of user interfaces, and displaying one of the user interfaces in the touch screen of the portable handheld electronic device;
displaying a representative icon bar in the touch screen, wherein the representative icon bar comprises a plurality of representative icons respectively corresponding to the user interfaces and each representative icon display a pattern related to the function of the user interface corresponding to the representative icon;
detecting a first touch signal in response to a touch from a user by the touch screen; and moving the representative icon bar according to the displacement of the detected first touch signal in response to the first touch signal being detected to fall in the representative icon bar;
displaying a bar comprising at least one hot key corresponding to the currently displayed user interface; and
detecting a second touch signal in response to a touch from a user by the touch screen; and switching the user interface and correspondingly switching the hot key according to the representative icon on which the second touch signal is detected in response to the second touch signal being detected to fall in the representative icon in the representative icon bar.

9. A portable handheld electronic device adapted to switch a user interface thereof, comprising:
a touch screen, for detecting a touch signal in response to a touch input from a user on the touch screen of the portable handheld electronic device;
a user interface display module, for displaying one of a plurality of user interfaces in the touch screen;
a representative icon bar display module, for displaying a representative icon bar in the touch screen, wherein the representative icon bar comprises a plurality of representative icons respectively corresponding to the user interfaces;
a hot key bar display module, for displaying a hot key bar in the touch screen, wherein the hot key bar comprises at least one hot key corresponding to the currently displayed user interface; and
a switch module, for switching the user interface and correspondingly switching the hot key according to the touch signal detected by the touch screen, wherein
in response to the touch signal being detected to fall in the representative icon bar move within the representative icon bar, and terminated on a representative icon, the displayed user interface and the hot key are switched according to the representative icon on which the touch signal is terminated.

10. The portable electronic device according to claim 9, wherein the representative icon bar display module further comprises highlighting the representative icon to which the touch signal is moved in the representative icon bar.

11. The portable electronic device according to claim 9, wherein the representative icon bar display module further comprises highlighting the representative icon corresponding to the displayed user interface in the representative icon bar.

12. The portable electronic device according to claim 9, wherein the switch module further comprises determining the representative icon to which the touch signal is moved and displaying a user interface preview text corresponding to the representative icon to which the touch signal is moved.

13. The portable electronic device according to claim 9, wherein each of the user interfaces is corresponding to a function or a sub-function of a function.

14. A portable handheld electronic device adapted to switch a user interface thereof, comprising:
a touch screen, for detecting a touch signal in response to a touch input from a user on the touch screen of the portable handheld electronic device;
a user interface display module, for displaying one of a plurality of user interfaces in the touch screen;
a representative icon bar display module, for displaying a representative icon bar in the touch screen, wherein the representative icon bar comprises a plurality of representative icons respectively corresponding to the user interfaces;
a hot key display module, for displaying at least one hot key in a bar in the touch screen, wherein the displayed hot key corresponding to the currently displayed user interface; and
a switch module, for switching the user interface and the hot key according to the touch signal detected by the touch screen, wherein
in response to a first touch signal being detected to fall in the representative icon bar and move within the representative icon bar, the representative icon bar is moved correspondingly to the detected first touch signal, and in response to a second touch signal being detected to fall in the representative icon bar, the displayed user interface and the at least on hot key are switched according to the representative icon on which the second touch signal is detected.

15. The portable electronic device according to claim 14, wherein each of the user interfaces is corresponding to a function or a sub-function of a function.

16. A portable handheld electronic device adapted to switch a user interface thereof, wherein the portable handheld electronic device comprises contacts, messages, e-mail, camera, music player, browser, weather, and setting functions and has a touch screen for detecting a touch signal in response to a touch input from a user on the touch screen of the portable handheld electronic device, wherein the touch screen further displays:

one of a plurality of user interfaces;

a representative icon bar comprising a plurality of representative icons respectively corresponding to the user interfaces and each representative icon display a pattern related to the function of the user interface corresponding to the representative icon, wherein in response to a first touch signal being detected to fall falls in the representative icon bar and move within the representative icon bar, the representative icon bar is moved correspondingly to the detected first touch signal; and at least on hot key in a bar corresponding to the currently displayed user interface, wherein in response to a second touch signal being detected to fall in the representative icon bar, the displayed user interface and the hot key are switched according to the representative icon on which the second touch signal is detected.

17. A user interface switching method, for use in a portable handheld electronic device having a touch screen, the method comprising:

providing a plurality of user interfaces, and displaying one of the user interfaces in the touch screen of the portable handheld electronic device;

displaying a representative icon bar in the touch screen, wherein the representative icon bar comprises a plurality of representative icons respectively corresponding to the user interfaces, and displaying a bar comprising at least one hot key corresponding to the currently displayed user interface;

detecting a first touch signal in response to a touch signal from a user by the touch screen;

in response to the first touch signal being detected to fall in a representative icon in the representative icon bar, switching the user interface and correspondingly switching the hot key according to the representative icon on which the second touch signal is detected;

detecting a second touch signal in response to a touch signal from a user by the touch screen; and in response to the second touch signal being detected to fall in the displayed user interface and moved in a sliding manner within the displayed user interface and a displacement of sliding of the second touch signal exceeds a predetermined value, switching the displayed user interface to a next one user interface or to a previous one user interface according to the moving direction of the second touch signal, and switching the hot key corresponding to the switched user interface.

18. The method according to claim 17, further comprising:

in response to the second touch signal being detected to fall in the displayed user interface and moved in a sliding manner within the displayed user interface and the displacement of sliding of the second touch signal exceeds the predetermined value, moving the representative icon bar corresponding to the switched user interface.

19. A portable handheld electronic device adapted to switch a user interface thereof, comprising:

a touch screen, for detecting a touch signal in response to a touch input from a user on the touch screen of the portable handheld electronic device;

a user interface display module, for displaying one of a plurality of user interfaces in the touch screen;

a representative icon bar display module, for displaying a representative icon bar in the touch screen, wherein the representative icon bar comprises a plurality of representative icons respectively corresponding to the user interfaces;

a hot key display module, for displaying at least one hot key in a bar in the touch screen, wherein the displayed hot key corresponding to the currently displayed user interface; and a switch module, for switching the user interface and the hot key according to the touch signal detected by the touch screen, wherein in response to a first touch signal being detected to fall in the representative icon bar, the displayed user interface and the at least on hot key are switched according to the representative icon on which the first touch signal is detected, and in response to a second touch signal being detected to fall in the displayed user interface and moved in a sliding manner within displayed the user interface and a displacement of sliding of the second touch signal exceeds a predetermined value, the displayed user interface are switched to a next one user interface or to a previous one user interface according to the moving direction of the second touch signal, and the hot key are switched corresponding to the switched user interface.

20. The portable electronic device according to claim 19, wherein in response to the second touch signal being detected to fall in the displayed user interface and moved in a sliding manner within displayed the user interface and the displacement of sliding of the second touch signal exceeds the predetermined value, the representative icon bar is moved corresponding to the switched user interface.

* * * * *